US009021173B2

(12) United States Patent
Cracraft et al.

(10) Patent No.: US 9,021,173 B2
(45) Date of Patent: Apr. 28, 2015

(54) HIGH SPEED DIFFERENTIAL WIRING STRATEGY FOR SERIALLY ATTACHED SCSI SYSTEMS

(71) Applicant: International Business Machines Corporation, Armonk, NY (US)

(72) Inventors: Michael Andrew Cracraft, Poughkeepsie, NY (US); Steven Louis Makow, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 242 days.

(21) Appl. No.: 13/661,391

(22) Filed: Oct. 26, 2012

(65) Prior Publication Data

US 2014/0122766 A1 May 1, 2014

(51) Int. Cl.

*H01P 3/08* (2006.01)
*G06F 13/00* (2006.01)
*H01P 5/18* (2006.01)

(52) U.S. Cl.

CPC ................ *H01P 3/081* (2013.01); *H01P 5/184* (2013.01)

(58) Field of Classification Search

CPC ........... H01P 3/08; H01P 3/081; H01P 3/082; H01P 3/084; H01P 5/185; H01P 5/187; H01P 5/184

USPC ........................... 333/116, 128; 710/313, 300

See application file for complete search history.

(56) References Cited

U.S. PATENT DOCUMENTS 7,444,445 B2 10/2008 Kubo et al.
7,475,163 B1 1/2009 Klein et al.
7,673,185 B2 3/2010 Kalwitz et al.
7,701,222 B2 * 4/2010 Cases et al. .................. 324/501
7,814,245 B2 10/2010 Schauer
7,949,789 B2 5/2011 Dickens et al.
2008/0140898 A1 * 6/2008 Bacom et al. ................. 710/300
2010/0046590 A1 2/2010 Harper et al.
2010/0109816 A1 * 5/2010 Tzuang et al. ................ 333/238
2011/0128090 A1 * 6/2011 Sakiyama et al. .............. 333/33
2011/0314141 A1 12/2011 Jibbe et al.
2012/0043117 A1 * 2/2012 Kato et al. .................... 174/254
2012/0161893 A1 * 6/2012 Ye .................................... 333/5

OTHER PUBLICATIONS

Na, Nanju et al, “Link Analysis and Design of High Speed Storage Buses in Backplane and Cabling Environments”, Electronic Components and Technology Conference (ECTS), 2010 Proceedings 60th Digital Object Identifier: 10.1109/ECTC.2010.5490690, 2010, pp. 1929-1934.

(Continued)

*Primary Examiner* — Glenn A Auve
(74) *Attorney, Agent, or Firm* — Keivan E. Razavi; Margaret Pepper

(57) ABSTRACT

A serial attached SCSI (SAS) system may include a host bus adaptor, a bus expander, and a multi-layer data transmission medium coupled between the host bus adaptor and the bus expander. The multi-layer data transmission medium may include a first microstrip structure located at a top surface portion of the multi-layer data transmission medium and a first stripline structure located within a first internal portion of the multi-layer data transmission medium. The microstrip structure provides, among other things, a repeaterless high-speed serial communications link between the host bus adaptor and the bus expander.

18 Claims, 4 Drawing Sheets

100
122
SAS Host Bus Adaptor (HBA) Device
HBA Board Stripline Transmission Medium
Mini-SAS Cable Connector
SAS Passive Cable
Mini-SAS Cable Connector
102
104
106
108
110
Multi-Layer Transmission Medium with Low-Loss Microstrip and Standard Loss Stripline
112
124
Backplane Stripline Transmission Medium
Bus Expander StriplineTransmission Medium with AC coupling
SAS Bus Expander Device
120
114
116
118

(56) References Cited

OTHER PUBLICATIONS

Anonymously disclosed, "Method for physical virtualization of an array of serial hard disk drive storage devices", IPCOM000009833D, www.ip.com, Sep. 20, 2002.

IBM, "Adjusting Pre-Emphasis at a Transmitter Based on Receiver Feedback on a SAS Link", IPCOM000178132D, www.ip.com, Jan. 16, 2009.

* cited by examiner

HIGH SPEED DIFFERENTIAL WIRING STRATEGY FOR SERIALLY ATTACHED SCSI SYSTEMS

BACKGROUND a. Field of the Invention

The present invention generally relates to data communications in Small Computer System Interface (SCSI) systems, and more particularly, to high-speed data communications in Serial Attached SCSI (SAS) systems.

b. Background of Invention

Serial Attached SCSI (SAS) systems are used for providing serial connections between host computers and peripherals such as disk storage devices. In particular SAS devices may provide high speed serial data communications for the transfer of storage data under a SAS protocol data format. For example, second-generation SAS (SAS-2) devices may include data-rates of 6 Gb/s over a physical link, whereby each connection employs two-wires for providing differential signalling. Each physical link may operate in full-duplex mode by having 2 lanes for providing simultaneous differential signalling for both transmitting and receiving SAS data.

In order to maintain a low error-rate or error-free transmission environment in SAS systems, repeaters may be used to regenerate data. For example, SAS-2 6 Gb/s interfaces that drive greater than 20-30 inches of card (e.g., PCB Board) through multiple connectors to a SAS copper cable may typically require an active repeater module for connection between a SAS-2 Host Bus Adaptor and SAS-2 Bus Expander. However, the addition of one or more repeater modules introduces more complexity to the SAS system. For example, apart from an increased cost aspect, additional voltage regulation of the repeater module may be required. Also, the exchange of additional out-of-band control data is needed for configuring/re-configuring the operational requirements of the repeater module. Further, the repeater, as an active device, may be prone to failure, which would require a storage enclosure holding the repeater module to be powered down for replacement.

It may, therefore, be advantageous to, among other things, reduce or eliminate the use of repeater modules in SAS or other high-speed serial communication systems.

BRIEF SUMMARY

According to at least one exemplary embodiment, a serial attached SCSI (SAS) system may include a host bus adaptor, a bus expander, and a multi-layer data transmission medium coupled between the host bus adaptor and the bus expander. The multi-layer data transmission medium includes a first microstrip structure located at a top surface portion of the multi-layer data transmission medium and a first stripline structure located within a first internal portion of the multi-layer data transmission medium. The microstrip structure provides, among other things, a repeaterless high-speed serial communications link between the host bus adaptor and the bus expander.

According to at least one other exemplary embodiment, a serial attached SCSI (SAS) system may include a host bus adaptor, a bus expander, and a multi-layer data transmission medium coupled between the host bus adaptor and the bus expander. The multi-layer data transmission medium includes a first microstrip structure located at a top surface portion of the multi-layer data transmission medium and a second microstrip structure located at a bottom surface portion of the multi-layer data transmission medium. The first and the second microstrip structure provide repeaterless high-speed serial communication links between the host bus adaptor and the bus expander.

According to yet another exemplary embodiment, a repeaterless serial attached SCSI (SAS) multi-layer transmission medium may include a microstrip structure that has a differential signalling layer associated with an outer surface of the multi-layer transmission medium, a ground plane layer, and a low-loss dielectric layer located between the differential signalling layer and the ground plane layer. The repeaterless serial attached SCSI (SAS) multi-layer transmission medium may also include a stripline structure that has a ground plane layer associated with an internal layer of the multi-layer transmission medium, a standard-loss dielectric layer located over the ground plane layer, and a signalling layer located within the standard-loss dielectric layer. The microstrip structure may provide a repeaterless high-speed serial communications link for SAS data transfer between a host bus adaptor and a bus expander. The stripline structure may provide a low-speed communications link for control data.

BRIEF DESCRIPTION OF THE SEVERAL VIEWS OF THE DRAWINGS

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

The following describes an exemplary embodiment of a SAS system that utilizes a repeaterless transmission medium for providing high-speed serial data communications (e.g., 1.5 Gb/s; 3 Gb/s; 6 Gb/s) between a SAS host bus adaptor (HBA) and a SAS bus expander.

Figure 1:
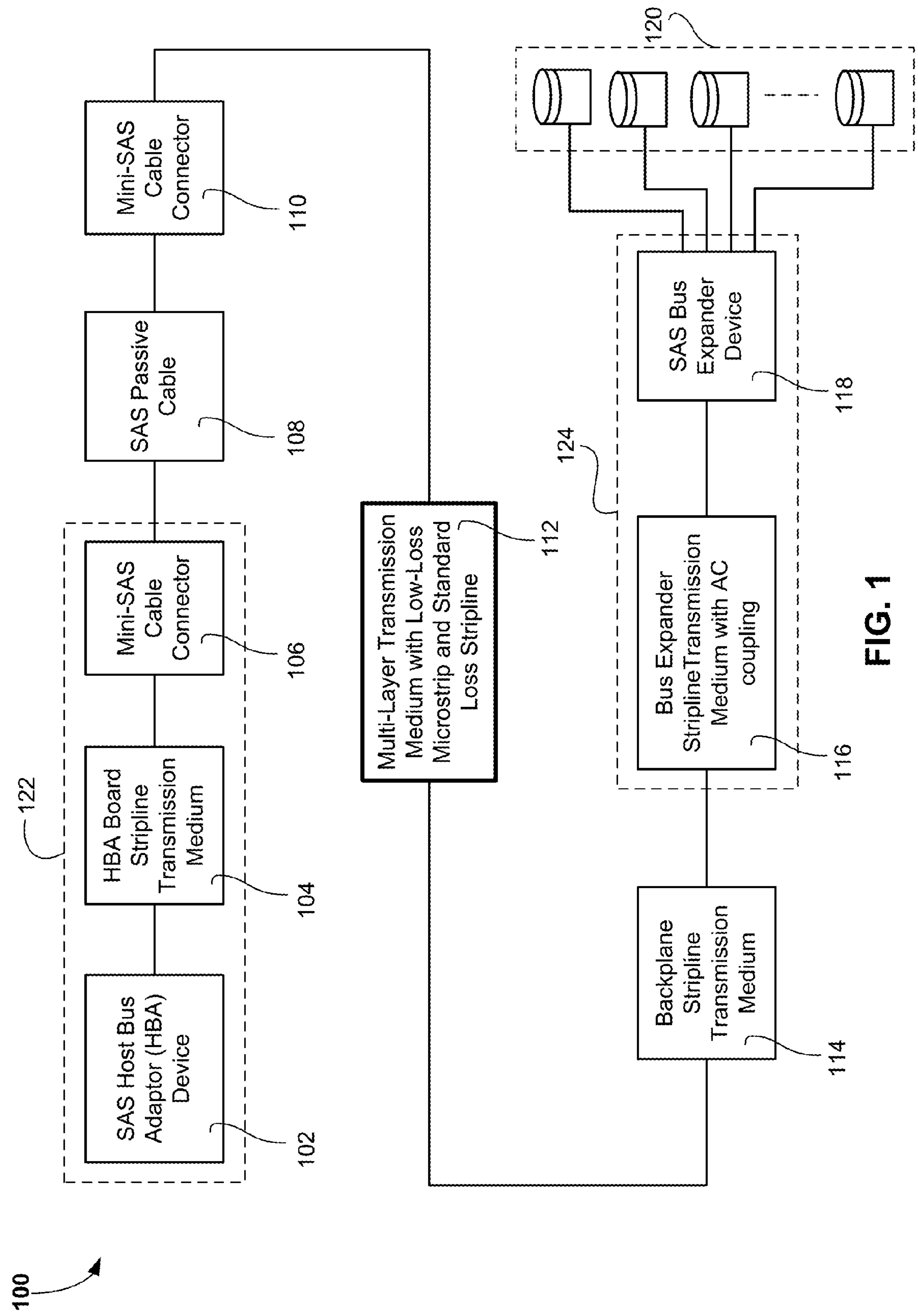
FIG. 1 is a Serial Attached SCSI (SAS) system block diagram using a repeater-less configuration according to an exemplary embodiment.

Referring to FIG. 1, a Serial Attached SCSI (SAS) system block diagram 100 using a repeater-less configuration according to an exemplary embodiment is illustrated. The SAS system 100 may, for example, include a SAS host bus adaptor (HBA) device 102, an HBA stripline transmission medium 104, mini-SAS cable connector 106, mini-SAS cable 108 (e.g., 0.8-3.0 meters), mini-SAS cable connector 110, multilayer transmission medium 112, backplane stripline transmission medium 114, bus expander stripline transmission medium 116, a SAS bus expander device 118, and a plurality of SAS storage drives (e.g., Hard Disk Drives—HDDs) 120. As depicted by dashed line box 122, the SAS host bus adaptor (HBA) device 102, HBA stripline transmission medium 104, and mini-SAS cable connector 106 may be constructed on a single card. An example of a SAS HBA card may be a PCIe (Component Interconnect Peripheral express) small form-factor adapter with a SAS-2 controller ASIC. As depicted by dashed line box 124, the bus expander stripline transmission medium 116 and the SAS bus expander device 118 may also be constructed on a single expander card that connects to the plurality of SAS HDDs 120 via, for example, HDD backplanes (not shown).

In operation, under the SAS protocol (e.g., SAS-2), storage data received from, for example, a computer server (not shown) may be serially transmitted at a high data-rate (e.g., 6 Gb/s) from the HBA device 102 over the multilayer transmission medium 112 via the HBA stripline transmission medium 104, mini-SAS cable connector 106, mini-SAS cable 108, and mini-SAS cable connector 110. The multilayer transmission medium 112 may then convey the transmitted storage data to the stripline transmission medium of the backplane 114. The transmitted storage data is then received by the AC coupled stripline transmission medium of the bus expander 116 from the backplane stripline transmission medium 114. From the AC coupled stripline transmission medium 116, the transmitted storage data is received and processed by the SAS bus expander device 118 and distributed to one or more designated (i.e., addressed) SAS HDDs 120.

Alternatively, under the SAS protocol (e.g., SAS-2), a storage data request from, for example, a computer server (not shown) may be serially transmitted at a high data-rate (e.g., 6 Gb/s) from the HBA device 102 over the multilayer transmission medium 112 via the HBA stripline transmission medium 104, the mini-SAS cable connector 106, mini-SAS cable 108, and the mini-SAS cable connector 110. The multilayer transmission medium 112 may then convey the transmitted storage data request to the stripline transmission medium of the backplane 114. The transmitted storage data request is then received by the AC coupled stripline transmission medium of the bus expander 116 from the backplane stripline transmission medium 114. From the AC coupled stripline transmission medium 116, the transmitted storage data request is received and processed by the SAS bus expander device 118, whereby storage data corresponding to the received storage data request is accessed from one or more designated (i.e., addressed) SAS HDDs 120 by the SAS bus expander device 118. The accessed storage data may then be serially transmitted at a high data-rate (e.g., 6 Gb/s) from the SAS bus expander device 118 over the multilayer transmission medium 112 via the AC coupled stripline transmission medium of the bus expander 116 and the backplane stripline transmission medium 114. The multilayer transmission medium 112 may then convey the transmitted storage data to the HBA stripline transmission medium 104 via mini-SAS cable connector 110, SAS cable 108, and mini-SAS cable connector 106. The transmitted storage data is received and processed by the HBA device 102. The HBA device 102 may then send the requested storage data to, for example, the requesting computer server (not shown).

In the exemplary embodiment depicted in FIG. 1, the multilayer transmission medium 112 provides a low-loss transmission medium that mitigates or removes a requisite need for the use of a repeater device in the existing communication link between the SAS HBA 102 and SAS bus expander 118. In particular, the multilayer transmission medium 112 enables low-loss transmission to be accomplished while using standard SAS cables, SAS connectors, and other coupling means without the inherent complexity of introducing active signal processing devices such as repeaters.

Figure 2A:
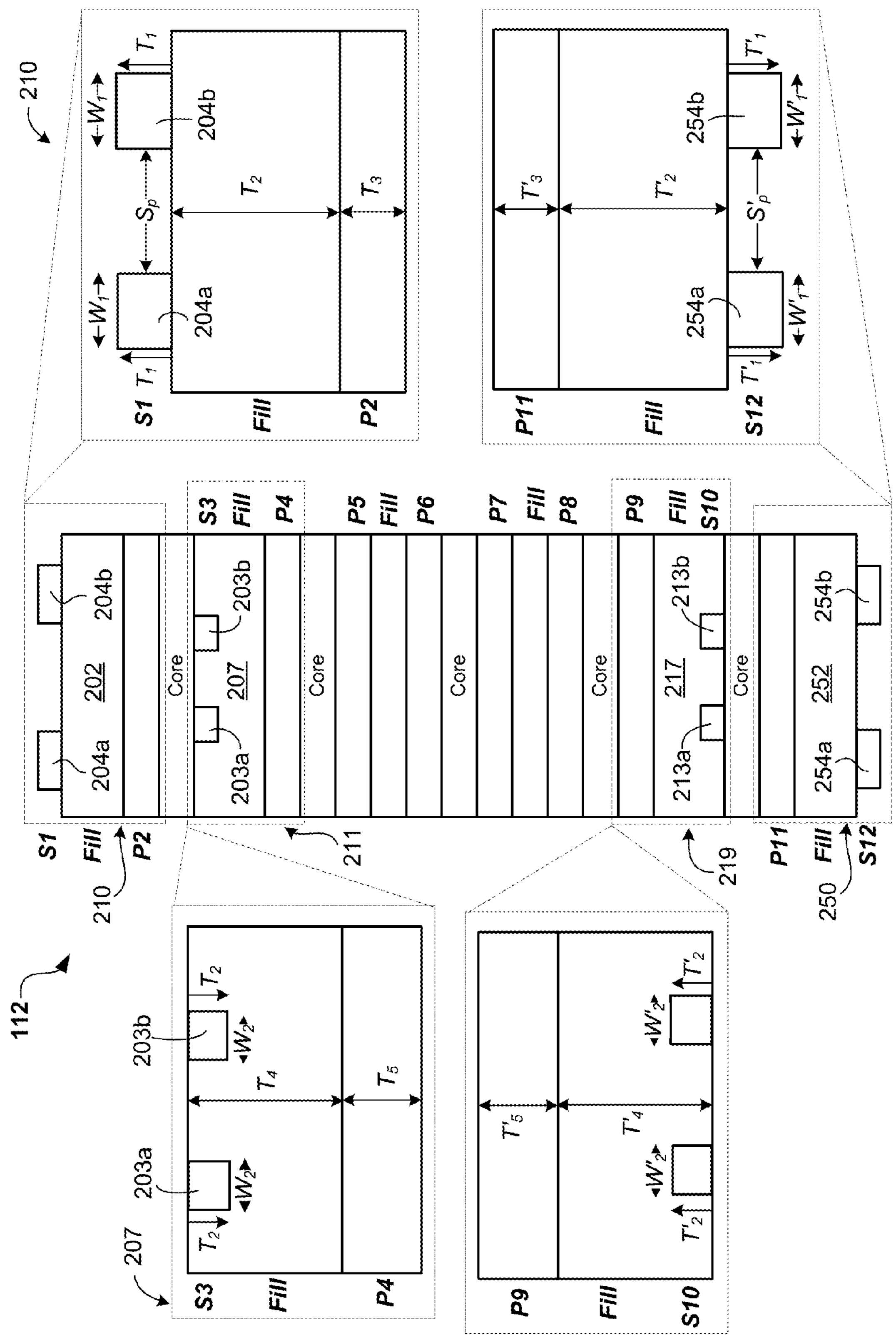
FIG. 2A is an exemplary embodiment of a multi-layer transmission medium utilized within the system block diagram of FIG. 1.

FIG. 2A is a detailed cross section view of the exemplary embodiment of multi-layer transmission medium 112 shown in FIG. 1. Multi-layer transmission medium 112 may, for example, include a multi-layer printed circuit board (PCB) having a hybrid dielectric loss property. For example, as described in the following paragraphs, the multi-layer transmission medium 112 may include a low loss dielectric material that is used for high-speed SAS data communications and a standard loss dielectric material that is utilized for low-speed control data. In addition, the multi-layer transmission medium 112 may also provide power distribution to, for example, the SAS HDDs 120.

Figure 2B:
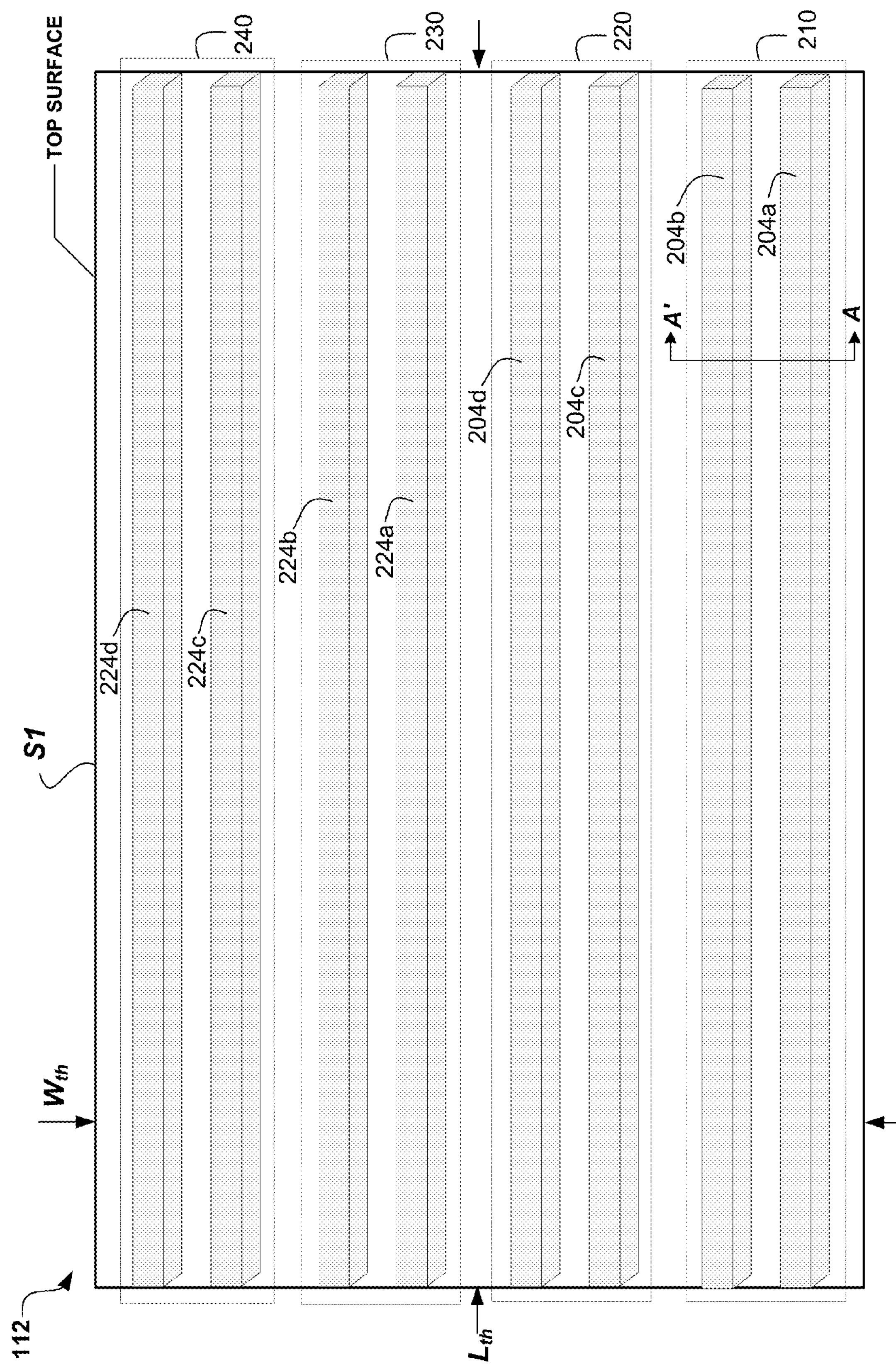
FIG. 2B is a plan view showing the top high-speed signalling layer of the exemplary multi-layer transmission medium embodiment shown in FIG. 2A.

As illustrated in FIG. 2A, the cross section view (across axis A-A': FIG. 2B) of multi-layer transmission medium 112 shows multiple layers that extend from signal layer S1 located on the top portion of the PCB through to signal layer S12 located on the bottom portion of the PCB.

Signal layer S1, fill layer 202, and power plane layer P2 form a microstrip structure 210 that is used for providing high-speed SAS communications (e.g., 6 Gb/s link). For purposes of clarity, an expanded view of microstrip structure 210 is provided in the upper right-hand portion of the drawing. As depicted, within signalling layer S1, differential signal conductor lines 204*a* and 204*b* carry differential signals, whereby the differential signal conductor lines 204*a*, 204*b* may be used to transfer either high-speed data transmitted by the HBA 102 (FIG. 1) or high-speed data received from the bus expander 118 (FIG. 1).

Signalling layer S1 is better illustrated in FIG. 2B, where a plan view of the multi-layer transmission medium 112 depicts two (x2) physical high-speed links located on the top surface of the multi-layer transmission medium 112 and having the above described microstrip structure. In SAS communications, each physical link may include 4-conductor lines or wires such that a full duplex operating mode is accomplished by the ability to simultaneously transmit SAS data over one pair of signal conductor lines while receiving SAS data over another pair of signal conductors. Thus, microstrip structures 210 and 220 may be designated as the first physical high-speed link, and microstrip structures 230 and 240 may be designated as the second physical high-speed link. Although, two (x2) physical high-speed links are depicted, any number of physical high-speed links may be provided based on the width $W_{th}$ of the multi-layer transmission medium 112. If the width $W_{th}$ of the multi-layer transmission medium 112 is increased, more physical high-speed links may therefore be accommodated. In the depicted embodiment, the length $L_{th}$ of the multi-layer transmission medium 112 may be about 22 inches.

As shown in FIG. 2B, for example, at the first physical high-speed link, data transmitted by the HBA device 102 (FIG. 1) may be communicated over differential signal conductor lines 204*a* and 204*b* of microstrip structure 210, while data received by the HBA device 102 (FIG. 1) may be communicated over differential signal conductor lines 204*c* and 204*d* of microstrip structure 220. Similarly, at the second physical high-speed link, data transmitted by the HBA device 102 (FIG. 1) may be communicated over differential signal conductor lines 224*a* and 224*b* of microstrip structure 230, while data received by the HBA device 102 (FIG. 1) may be communicated over differential signal conductor lines 224*c* and 224*d* of microstrip structure 240.

Referring to FIG. 2A, each of the differential signal conductor lines 204*a*, 204*b* of microstrip structure 210 may have a width, as denoted by $W_1$, of about 9 mil (i.e., 1 mil: 0.001 inch). According to some embodiments, however, the width $W_1$ of the differential signal conductor lines 204*a*, 204*b* may range from about 7-10 mil. Each of the differential signal conductor lines 204*a*, 204*b* may have a thickness, as denoted by $T_1$, of about 2 mil. The spacing, as denoted by $S_p$, between the differential signal conductor lines 204*a*, 204*b* may be about 12 mil. In the depicted exemplary embodiment, the 12 mil spacing between the differential signal conductor lines

204*a*, 204*b* is established in order to ensure that the microstrip structure 210 is a 100Ω transmission system at 6 Gb/s data rates. The fill layer 202 of the microstrip structure 210 utilizes a low loss dielectric material having a dissipation factor ($D_f$) or loss tangent of about 0.006 or less. Such low loss material may be manufactured by, for example, PANASONIC's Megtron 6™ generation of materials. For instance, a Megtron 6™ laminate sample having a thickness of 0.006 of an inch may exhibit a dissipation factor ($D_f$) as low as approximately 0.0025 at 6 Ghz. The fill layer 202 may have a thickness, as denoted by $T_2$, of about 5 mil. The power plane layer P2 of the microstrip structure 210 is a ground plane formed by 2 oz copper having a thickness, as indicated by $T_3$, of about 2.5 mil.

Similarly, signal layer S12, fill layer 252, and power plane layer P11 form another microstrip structure 250 that is also used for providing high-speed SAS communications (e.g., 6 Gb/s link). For purposes of clarity, an expanded view of microstrip structure 250 is provided in the lower right-hand portion of the drawing. As depicted, within signalling layer S12, differential signal conductor lines 254*a* and 254*b* carry differential signals, whereby the differential signal conductor lines 254*a*, 254*b* may be used to transfer either high-speed data transmitted by the HBA 102 (FIG. 1) or high-speed data received from the bus expander 118 (FIG. 1).

Figure 2C:
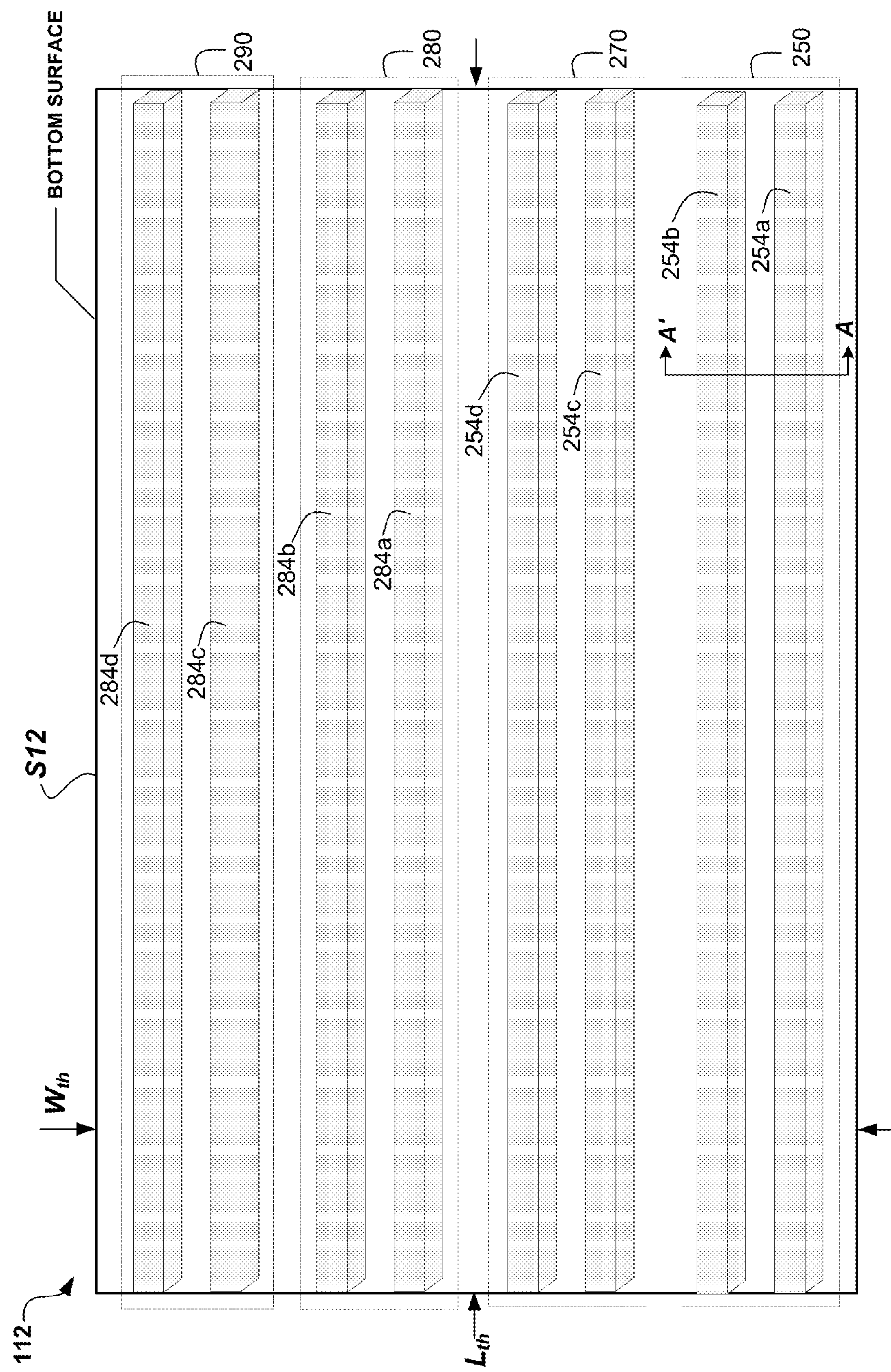
FIG. 2C is a plan view showing the bottom high-speed signalling layer of the exemplary multi-layer transmission medium embodiment shown in FIG. 2A.

Signalling layer S12 is better illustrated in FIG. 2C, where a plan view of the multi-layer transmission medium 112 depicts two (x2) physical high-speed links located on the bottom surface of the multi-layer transmission medium 112 and having the above described microstrip structure. In SAS communications, each physical link may include 4-conductor lines or wires such that a full duplex operating mode is accomplished by the ability to simultaneously transmit SAS data over one pair of signal conductor lines while receiving SAS data over another pair of signal conductors. Thus, microstrip structures 250 and 270 may be designated as the first physical high-speed link, and microstrip structures 280 and 290 may be designated as the second physical high-speed link. Although, two (x2) physical high-speed links are depicted, any number of physical high-speed links may be provided based on the width $W_{th}$ of the multi-layer transmission medium 112. As previously described, if the width $W_{th}$ of the multi-layer transmission medium 112 is increased, more physical high-speed links may therefore be accommodated.

As shown in FIG. 2C, for example, at the first physical high-speed link, data transmitted by the HBA device 102 (FIG. 1) may be communicated over differential signal conductor lines 254*a* and 254*b* of microstrip structure 250, while data received by the HBA device 102 (FIG. 1) may be communicated over differential signal conductor lines 254*c* and 254*d* of microstrip structure 270. Similarly, at the second physical high-speed link, data transmitted by the HBA device 102 (FIG. 1) may be communicated over differential signal conductor lines 284*a* and 284*b* of microstrip structure 280, while data received by the HBA device 102 (FIG. 1) may be communicated over differential signal conductor lines 284*c* and 284*d* of microstrip structure 290.

Referring to FIG. 2A, as with microstrip structure 210, each of the differential signal conductor lines 254*a*, 254*b* of microstrip structure 250 may have a width, as denoted by $W'_1$, of about 9 mil (i.e., 1 mil: 0.001 inch). According to some embodiments, however, the width $W'_1$ of the differential signal conductor lines 254*a*, 254*b* may range from about 7-10 mil. Each of the differential signal conductor lines 254*a*, 254*b* may have a thickness, as denoted by $T'_1$, of about 2 mil. The spacing, as denoted by $S'_p$, between the differential signal conductor lines 254*a*, 254*b* may be about 12 mil. In the depicted exemplary embodiment, the 12 mil spacing between the differential signal conductor lines 254*a*, 254*b* is established in order to ensure that the microstrip structure 250 is a 100Ω transmission system at 6 Gb/s data rates. The fill layer 252 of the microstrip structure 250 utilizes a low loss dielectric material having a dissipation factor ($D_f$) or loss tangent of about 0.006 or less. As previously described, such low loss material may be manufactured by, for example, PANASONIC's Megtron 6™ generation of materials. For instance, a Megtron 6™ laminate sample having a thickness of 0.006 of an inch may exhibit a dissipation factor ($D_f$) as low as approximately 0.0025 at 6 Ghz. The fill layer 252 may have a thickness, as denoted by $T'_2$, of about 5 mil. The power plane layer P11 of the microstrip structure 250 may also be a ground plane formed by 2 oz copper having a thickness, as indicated by $T'_3$, of about 2.5 mil.

Referring to FIGS. 2B and 2C, microstrip structures 220, 230, 240, 270, 280, and 290 may have a structure that is the same as, or substantially similar to, that of microstrip structures 210 and 250. Microstrip structures may generally include electrically conductive strips that are separated from a ground plane by a dielectric material, whereby part of the conductive strips interface with air and the other part of the strips interface with a dielectric material. Thus, based on the air interface aspect of a microstrip structure, microstrip structures 250, 270, 280, and 290 are formed on the bottom surface portion of the multi-layer transmission medium 112, while microstrip structures 210, 220, 230, and 240 are formed on the top surface portion of the multi-layer transmission medium 112. With the microstrip structures, the combined air and dielectric interfaces with the conductive strips may provide a lower effective dissipation factor ($D_f$) and consequently a lower transmission loss (e.g., dB/m).

As further illustrated in FIG. 2A, signal layer S3, fill layer 207, and power plane layer P4 form a stripline structure 211 that is used for providing low-speed data communications (e.g., KHz/MHz ranges). For purposes of clarity, an expanded view of stripline structure 207 is provided in the upper left-hand portion of the drawing. As depicted, within signalling layer S3, two signal conductor lines 203*a*, 203*b* may carry control data over the communications link between the HBA 102 (FIG. 1) and bus expander 118 (FIG. 1). For example, signal conductor line 203*a* may carry I2C bus data (SDA) while signal conductor line 203*b* may propagate an I2C clock (SCL). Other out-of-band control data may also be transmitted along signal conductor lines 203*a* and 203*b*, whereby network elements such as amplifiers, switches, and routers may be configured or controlled by such control data.

Referring to FIG. 2A, each of the signal conductor lines 203*a*, 203*b* of stripline structure 211 may have a width, as denoted by $W_2$, of about 3-4 mil. Each of the signal conductor lines 203*a*, 203*b* may have a thickness, as denoted by $T_2$, of about 1.2 mil. The fill layer 207 of the stripline structure 211 utilizes a standard loss dielectric material having a dissipation factor ($D_f$) of about 0.02 or higher. Such standard loss material may be manufactured by, for example, PANASONIC. For instance, a R-1755V FR-4 laminate exhibiting a dissipation factor ($D_f$) of approximately 0.02 at 6 GHz may be used as fill layer 207. The fill layer 207 may have a thickness, as denoted by $T_4$, of about 5 mil. The power plane layer P4 of the stripline structure 211 is a ground plane formed by 2 oz copper having a thickness, as indicated by $T_5$, of about 2.5 mil.

Similarly, as illustrated in FIG. 2A, signal layer S10, fill layer 217, and power plane layer P9 form another stripline structure 219 that also may be used for providing low-speed data communications (e.g., KHz/MHz ranges). For purposes of clarity, an expanded view of stripline structure 219 is provided in the lower left-hand portion of the drawing. As depicted, within signalling layer S10, two signal conductor lines 213*a*, 213*b* may carry control data over the communications link between the HBA 102 (FIG. 1) and bus expander 118 (FIG. 1). For example, signal conductor line 213*a* may carry I2C bus data (SDA) while signal conductor line 213*b* may propagate an I2C clock (SCL). Other out-of-band control data may also be transmitted along signal conductor lines 213*a* and 213*b*, whereby network elements such as amplifiers, switches, and routers may be configured or controlled by such control data.

Referring to FIG. 2A, each of the signal conductor lines 213*a*, 213*b* of stripline structure 219 may have a width, as denoted by $W'_2$, of about 3-4 mil. Each of the signal conductor lines 203*a*, 203*b* may have a thickness, as denoted by $T'_2$, of about 1.2 mil. As with stripline structure 207, fill layer 217 of the stripline structure 211 also utilizes a standard loss dielectric material having a dissipation factor ($D_f$) of about 0.02 or higher. Such a standard loss material may include, for example, an R-1755V FR-4 laminate exhibiting a dissipation factor ($D_f$) of approximately 0.02 at 6 GHz. The fill layer 217 may have a thickness, as denoted by $T'_4$, of about 5 mil. The power plane layer P4 of the stripline structure 219 is a ground plane formed by 2 oz copper having a thickness, as indicated by $T'_5$, of about 2.5 mil.

Although not shown, it may be appreciated that multiple stripline structures that are substantially similar or identical to stripline structure 211 may be distributed across the width $W_{th}$ (see FIG. 2B or 2C) of the multi-layer transmission medium 112. For example, as with the four microstrip structures shown in FIGS. 2B and 2C, multiple instances (e.g., 4 structures) of stripline structure 211 may exist within layers S3, P4, and fill 207. Similarly, multiple instances (e.g., 4 structures) of stripline structure 219 may also exist within layers S10, P9, and fill 217.

As depicted by the cross sectional view of FIG. 2A, the multi-layer transmission medium 112 separates the high-speed and low-speed communication links by providing high-speed low-loss data transmission over the outer layer (i.e., top/bottom layers) microstrip structures, while facilitating low-speed data transmission capabilities using the stripline structures. Such separation of the high-speed and low-speed links minimizes electrical signal cross-talk and further provides physical link space-optimization by allowing the low-speed links to reside within the intermediate layers of the multi-layer transmission medium 112 instead of occupying the requisite microstrip structure space on the outer layers (i.e., top/bottom layers) of the multi-layer transmission medium 112. The multi-layer transmission medium 112 also includes power plane layers P5, P6, P7, and P8, which may be utilized to deliver, for example, supply voltages to the SAS storage drives 120 (FIG. 1). Therefore, not only does the multi-layer transmission medium 112 alleviate the need for repeater devices, but also provides a multi-functional physical link that conveys, DC voltage, low-speed signals, and high-speed signals.

Using the system configuration shown in FIG. 1, instrumentation for evaluating eye-diagrams may be used to determine received data signal integrity and error rates. Based on eye diagram data, the above-described microstrip structures (e.g., FIG. 2: 210) have been found to provide low transmission-loss high-speed data communications having a sufficient signal-to-noise (S/N) ratio capable of facilitating error-free or low error-rate data transmission. For 6 Gb/s SAS-2 data transmission, a satisfactory (i.e., predetermined threshold) eye diagram may exhibit, for example, an eye opening (i.e., Veye) of at least about 100 mV and an eye width (i.e., Heye) or unit interval (UI) of at least about 0.3 (30%). Based on the SAS cable 108 being 3.0 meters in length, data received by the SAS bus expander 118 showed: Veye=215 mV and Heye=0.72, both of which exceed the predetermined threshold for a satisfactory eye diagram. Accordingly, no bit-errors were detected. Also, based on the SAS cable 108 being 0.6 meters in length, data received by the SAS bus expander 118 showed: Veye=215 mV and Heye=0.59, also exceeding the predetermined threshold for a satisfactory eye diagram.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the one or more embodiment, the practical application or technical improvement over technologies found in the marketplace, or to enable others of ordinary skill in the art to understand the embodiments disclosed herein.

What is claimed is:

1. A serial attached SCSI (SAS) system comprising:
- a host bus adaptor;
- a bus expander; and
- a multi-layer data transmission medium coupled between the host bus adaptor and the bus expander, the multi-layer data transmission medium including a first microstrip structure located at a top surface portion of the multi-layer data transmission medium and a first stripline structure located within a first internal portion of the multi-layer data transmission medium,
- wherein the first microstrip structure provides a repeaterless high-speed serial communications link between the host bus adaptor and the bus expander, and wherein the first stripline structure provides a low-speed data communications link between the host bus adaptor and the bus expander.

2. The system of claim 1, further comprising a plurality of storage drives coupled to the bus expander, wherein storage data is transferred between the host bus adaptor and the bus expander over the repeaterless high-speed serial communications link to the plurality of storage drives.

3. The system of claim 1, wherein the multi-layer data transmission medium comprises a second microstrip structure located on a bottom surface portion of the multi-layer data transmission medium.

4. The system of claim 1, wherein the multi-layer data transmission medium comprises a second stripline structure located within a second internal portion of the multi-layer data transmission medium.

5. The system of claim 1, wherein the first microstrip structure comprises:
- a differential signalling layer associated with the top surface portion;
- a ground plane layer associated with the top surface portion; and
- a low-loss dielectric layer associated with the top surface portion, the low-loss dielectric layer located between the differential signalling layer and the ground plane layer.

6. The system of claim 5, wherein the differential signalling layer comprises at least one pair of electrical conductors formed on the low-loss dielectric layer.

7. The system of claim 1, wherein the first stripline structure comprises:
- a ground plane layer associated with the first internal portion a standard-loss dielectric layer associated with the first internal portion, the standard-loss dielectric layer located over the ground plane layer; and a signalling layer associated with the first internal portion, the differential signalling layer located within the standard-loss dielectric layer.

8. The system of claim 7, wherein the signalling layer comprises a first and a second electrical conductor formed within the standard-loss dielectric layer.

9. The system of claim 8, wherein each of the first and the second electrical conductor comprises:

a conductor width of about 3-4 mil; and a conductor thickness of about 1.2 mil.

10. The system of claim 9, wherein the standard-loss dielectric layer comprises:

a dissipation factor of more than 0.02; and a layer thickness of about 5 mil.

11. The system of claim 10, wherein the ground plane layer comprises a layer thickness of about 2.5 mil.

12. The system of claim 1, wherein the repeaterless high-speed serial communications link comprises a transmission speed of 6 Gb/s.

13. The system of claim 12, wherein the repeaterless high-speed serial communications link comprises data transfer under a second generation SAS protocol.

14. A serial attached SCSI (SAS) system comprising:

a host bus adaptor;

a bus expander; and a multi-layer data transmission medium coupled between the host bus adaptor and the bus expander, the multi-layer data transmission medium including a first microstrip structure located at a top surface portion of the multi-layer data transmission medium and a first strip-line structure located within a first internal portion of the multi-layer data transmission medium, wherein the first microstrip structure provides a repeaterless high-speed serial communications link between the host bus adaptor and the bus expander, and wherein the first microstrip structure comprises:

a differential signalling layer associated with the top surface portion;

a ground plane layer associated with the top surface portion; and a low-loss dielectric layer associated with the top surface portion, the low-loss dielectric layer located between the differential signalling layer and the ground plane layer, and wherein the differential signalling layer comprises at least one pair of electrical conductors formed on the low-loss dielectric layer, wherein the at least one pair of electrical conductors comprise a conductor separation of about 12 mil.

15. The system of claim 14, wherein each of the at least one pair of electrical conductors comprises:

a conductor width of about 7-10 mil; and a conductor thickness of about 2 mil.

16. The system of claim 15, wherein the low-loss dielectric layer comprises:

a dissipation factor of less than 0.006; and a layer thickness of about 5 mil.

17. The system of claim 16, wherein the ground plane layer comprises a layer thickness of about 2.5 mil.

18. A serial attached SCSI (SAS) system comprising:

a host bus adaptor;

a bus expander;

a multi-layer data transmission medium coupled between the host bus adaptor and the bus expander, the multi-layer data transmission medium including a first microstrip structure located at a top surface portion of the multi-layer data transmission medium and a first strip-line structure located within a first internal portion of the multi-layer data transmission medium, wherein the first microstrip structure provides a repeaterless high-speed serial communications link between the host bus adaptor and the bus expander; and a plurality of storage drives coupled to the bus expander, wherein storage data is transferred between the host bus adaptor and the bus expander over the repeaterless high-speed serial communications link to the plurality of storage drives, wherein the multi-layer data transmission medium comprises a plurality of supply voltage layers operable to deliver supply voltages to respective ones of the plurality of storage drives.

* * * * *